United States Patent
Ingles et al.

[11] Patent Number: 6,042,932
[45] Date of Patent: Mar. 28, 2000

[54] BRAIDED BUSS BAR WITH SELECTIVELY CLAD SOLDER PAD ATTACHMENTS

[75] Inventors: Gerald Ingles, Big Rock; Raymond Simons, River Forest; Suellyn Collins, Chicago Ridge; Mario Garritano, Oak Lawn, all of Ill.

[73] Assignee: Methode Electronics, Inc., Chicago, Ill.

[21] Appl. No.: 09/064,556

[22] Filed: Apr. 22, 1998

[51] Int. Cl.[7] .............................. B32B 3/00; B23K 101/38
[52] U.S. Cl. ...................... 428/209; 428/210; 219/56.1; 219/85.18; 219/203; 219/522; 174/74 R; 174/92; 174/128.1; 174/129 R; 361/775; 392/435
[58] Field of Search ..................................... 428/209, 210, 428/620, 630, 643; 219/56.1, 56.22, 85.18, 203, 541, 522; 361/775; 338/306–309; 392/435, 432; 174/13, 16.2, 74 R, 92, 128.1, 129 B

[56] References Cited

U.S. PATENT DOCUMENTS

| | | | |
|---|---|---|---|
| 5,143,273 | 9/1992 | Topel et al. | 228/56.3 |
| 5,738,534 | 4/1998 | Ingles et al. | 439/83 |

Primary Examiner—Timothy M. Speer
Assistant Examiner—Bryant Young
Attorney, Agent, or Firm—David L. Newman

[57] ABSTRACT

A flexible buss bar adapted for electrical connection with circuitry carried by a glass pane is provided, as well as a method of attaching a flexible buss bar to a glass pane. The flexible buss bar includes a flexible conductor having at least one metallic contact pad affixed thereto. It is also contemplated to have a plurality of such metallic contact pads attached at regular intervals along the length of the flexible conductor. The spacing of the plurality of metallic contact pads is selected to match the locations of corresponding structures formed on the glass pane. Solder cladding is selectively adhered to portions of the at least one metallic contact such that the at least one metallic contact pad may be bonded to the corresponding structure located on the glass pane. The method of connecting a flexible buss bar to an electrical contact pad formed on the surface of a glass pane includes the steps of providing a flexible buss bar, providing at least one metallic contact element, and selectively cladding a portion of the metallic contact element with a solderable material having a relatively low melting point. The metallic contact element is then affixed to the flexible buss bar, and the flexible buss bar is placed against the glass pane with the metallic contact element in physical contact with the contact pad formed on the glass pane. The solder cladding is then re-flowed to bond the metallic contact element attached to the flexible conductor to the electrical contact pad formed on the glass pane.

15 Claims, 3 Drawing Sheets

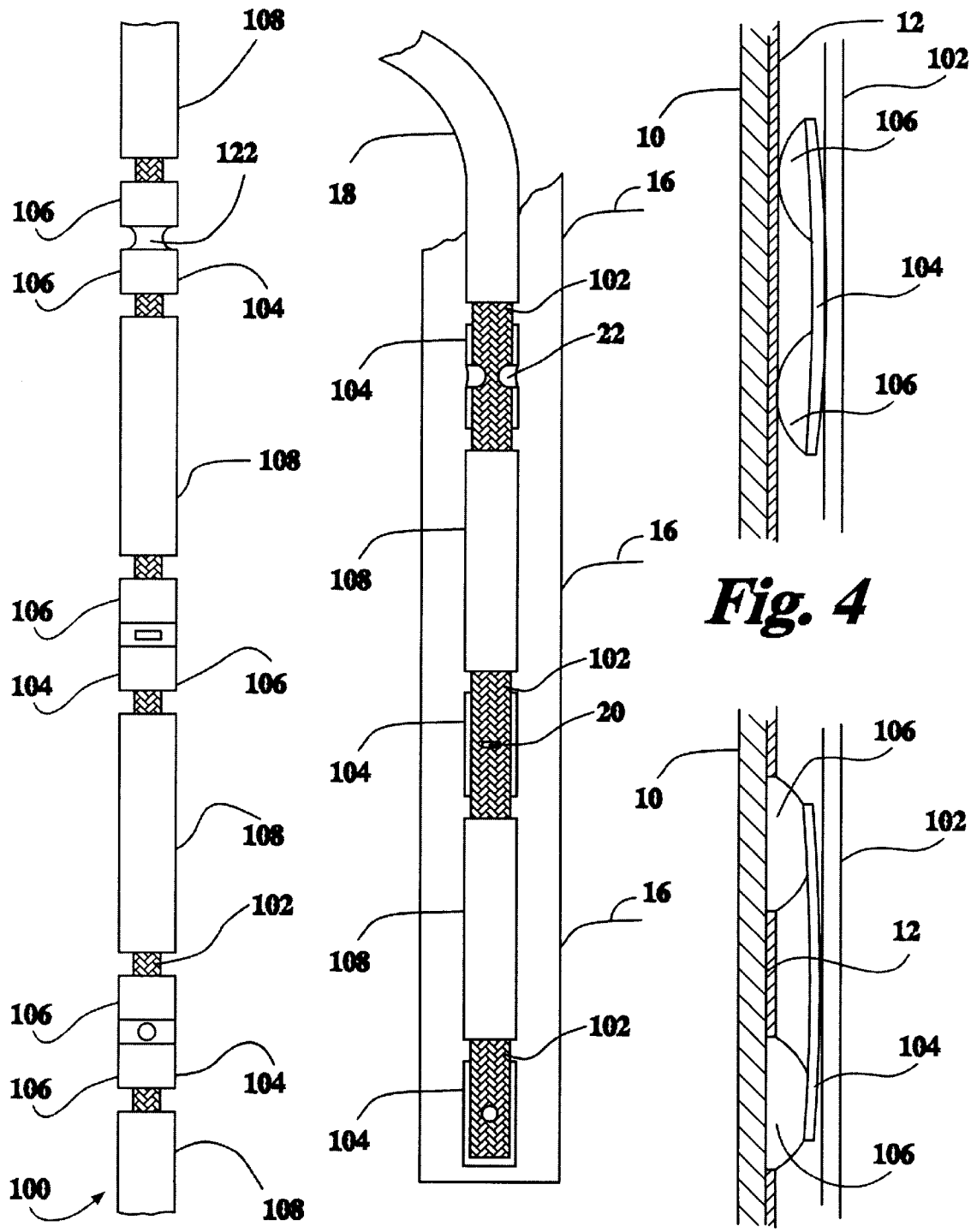

BRAIDED BUSS BAR WITH SELECTIVELY CLAD SOLDER PAD ATTACHMENTS

BACKGROUND OF THE INVENTION

The present invention relates to a flexible buss bar having selectively clad solder pads attached at predetermined intervals along the length thereof such that the buss bar may be electrically bonded to electrical structures disposed on a substantially flat substrate such as a glass pane.

In many of today's automobiles the rear glass window pane includes electrical circuitry adhered to the surface of the glass or embedded within the glass pane itself. Typically this circuitry will include an electric rear window defroster, and possibly power leads to supply the center rear brake lamp, or some other circuitry. A typical rear defrost system is shown in FIG. 1, including a glass pane 10, power rails 12, 14, and a plurality of heating elements 16 extending between the power rails 12, 14 across the rear viewing area of the window. The circuitry shown in FIG. 1 also includes power leads 18, 20 extending from each power rail 12, 14 to the rear center brake lamp 22. In most cases this circuitry is formed of a silver ceramic material and is adhered to a surface of the glass pane through a silk screening and firing process. The firing process sets the silver ceramic material resulting in a hardened pattern of conductive traces firmly embedded on the surface of the glass pane. However, because the traces are formed of a combination of silver and ceramic, the traces are not purely conductive. Each trace will have an associated resistance which is determined by the percentage of silver included in the silver ceramic mixture, and the cross sectional area of the trace itself. The thickness of each component is generally uniform throughout, such that the actual resistance of each component is determined by the width of the silver ceramic trace comprising the component. It follows then, that the narrow heating elements 16 will have greater resistance than the wider power rails 12, 14. When a voltage differential is applied across the two power rails 12, 14, an electrical current flows through the heating elements 16 from the higher potential rail, for example power rail 12, to the lower potential rail, for example power rail 14. Due to the generally higher resistance of the heating elements 16, the electrical current through the heating elements will generate heat sufficient to melt ice and evaporate condensation which may have built up on the surface of the window.

In order to power the electrical defrost unit depicted in FIG. 1, it is necessary to form an electrical connection between the power rails 12, 14 and external drive circuitry which is connected to a power source located elsewhere on the vehicle. The process of attaching external circuitry to the embedded circuitry on the glass presents a number of manufacturing problems. First, it is difficult to provide a suitably strong bond between the external circuitry and the embedded circuitry sufficient to ensure a reliable and durable connection. Furthermore, the prior art solutions to this problem have been relatively expensive both in to terms of the materials necessary to form the electrical connections, and the labor involved in making the connections.

To date, one of two different methods have been typically employed in bonding external circuitry to circuitry embedded within an automobile rear window pane. Both methods involve soldering an external electrical connector directly to the electrical power rails 12, 14. The first method involves soldering a single metallic clip, usually formed of copper, directly to each of the silver ceramic power rails 12, 14. A commonly employed geometry for such a metallic clip is that of a T. With this design the horizontal arms of the T are pre-clad in a solderable material and the vertical leg of the T forms a tab to which an external wire is attached. The pre-clad solderable material of a first clip is re-flowed to bond the clip to the first power rail 12, and the pre-clad solderable material of a second clip is re-flowed to bond the second clip to the second power rail 14. External wires are then attached to the vertical portion of the T shaped clips and connected to a wire harness which electrically connects the two power rails 12, 14 to a power supply.

In the second method of attaching external circuitry to the embedded circuitry, a flexible buss bar is provided having a plurality of preformed solder buttons attached thereto. Typically the flexible conductor is formed of a multi-stranded braided conductor to provide both strength and additional flexibility to the external buss bar. The solder buttons are located at intervals along the buss to provide multiple contact points with the power rails 12, 14. With this technique, the flexible buss is placed against the glass pane with the various solder buttons aligned against the power rails, and the solder buttons are re-flowed to bond with the silver ceramic material comprising the power rails. Re-flowing the solder buttons has generally been accomplished by manually applying a soldering iron to each individual solder button, a time consuming and labor intensive operation.

Both of the methods outlined above present unique difficulties in the manufacturing process of automobile rear window assemblies. In the case of the single clip attach method, larger quantities of silver are required when forming the power rails 12, 14. Because there is only a single attachment point, electrical current must be carried the entire length of the power rails to drive the heating elements located furthest away from the point of attachment. Near the point of attachment, the buss must be capable of carrying all of the current necessary to drive all of the circuitry embedded on the glass pane 10. Thus, an extra wide buss is required in order to accommodate these large currents. A wider buss requires greater amounts of silver and increases the material costs in manufacturing the window assembly. Furthermore, the single connection method results in a circuit with no redundant connection in case the primary connection fails. If this single connection fails, all of the electrical devices included on the window will become inoperable.

The solder button technique avoids these problems, but generates manufacturing difficulties of its own. This technique, employing an elongated braided conductor specifically adapted for the purpose of connecting to electrical components embedded within a glass pane is disclosed in U.S. Pat. No. 5,143,273 assigned to Methode Electronics Co. and is incorporated herein by reference. The braided conductor disclosed in the U.S. Pat. No. 5,143,273 includes a plurality of solder buttons attached at regular intervals along the length of the braided conductor. The solder buttons each comprise a mass of solder surrounding the braided conductor and enclosing a small amount of solder flux. When attaching the braided conductor to the glass pane, the solder buttons are placed against the silver ceramic buss power rails 12, 14 and heat is applied to the solder buttons, causing the solder buttons to melt against the rails. When the solder buttons cool, the solder re-solidifies and forms a strong reliable joint between the silver ceramic rails and the braided conductor. The advantage of this method is that, because there are multiple contact points, only a fraction of the total current consumed by the embedded circuitry actually flows through the power rails at any given point along the length of each rail. Thus, the buss can be made much narrower, thereby reducing the material cost of the silver power rails. This method has the further advantage of including multiple contact points with each rail such that if one solder joint fails, the full current may still be provided through the remaining contact points. Although the above described process results in a strong and reliable connection between the external circuitry and the embedded circuitry, the process is cumbersome and time consuming, and does not lend itself to automation. Furthermore, in re-flowing the solder buttons manually, a large amount of variability is introduced into the bonding process. Thus, the quality of the connections can vary significantly from one connection to the next, as well as from window assembly to window assembly. Such variability is highly undesirable in a mass production environment where consistent, high quality, and reliable connections must be repeated with every operation.

In light of the drawbacks contained in the prior art, what is needed is an improved flexible buss bar which lends itself to a wider range of attachment methods. It is desirable that such an improved buss bar would include contact pads attached to the buss bar at regular intervals along the length of the buss. The contact pads should be pre-clad with a solderable material such that when placed against contact structures formed on the glass pane, for example pre-screened silver ceramic power rails, the preclad material can be re-flowed in a controlled manner to form a strong reliable joint between the flexible buss bar and the electrical circuitry carried by the glass pane. Additionally, the improved flexible buss bar should be configured such that it can be robotically positioned against the glass and a precision soldering method employed to re-flow the solderable cladding surrounding the contact pads. Thus, an improved flexible buss bar would allow a highly automated process for bonding the buss bar to a glass pane wherein the quality of the individual connection points may be rigidly controlled, and accurately repeated over numerous soldering operations.

SUMMARY OF THE INVENTION

In light of the prior art as described above, one of the main objectives of the present invention is to provide an improved flexible buss bar for attaching external circuitry to embedded circuitry on or within a glass pane.

Another objective of the present invention is to provide a flexible buss bar which can be readily bonded to contact structures formed on a glass pane using automated soldering techniques.

Still another objective of the present invention is to provide a flexible buss bar for forming an electrical connection to circuitry embedded on a glass pane wherein contacts affixed to the flexible buss bar can be soldered to contact structures formed on the glass in an accurate, controlled, and repeatable manner.

A further object of the present invention is to provide a flexible buss bar having a plurality of metallic contact pads fixedly attached to the flexible buss bar at predefined intervals, the predefined intervals corresponding to the locations of contact structures formed on a glass window pain to which the flexible buss bar is to be connected.

Yet another objective of the present invention is to provide an improved flexible buss bar having a plurality of metallic contact pads attached thereto, wherein the contact pads are pre-clad with a controlled amount of solderable material.

An additional objective of the present invention is to provide a method for attaching a flexible buss bar to circuitry embedded on a glass pane wherein selectively pre-clad metallic contact pads are fixedly attached to the flexible buss at regular intervals corresponding to the location of electrical contacts screened onto the glass pane.

A still further objective of the present invention is to provide a method for attaching a flexible buss bar to electrical circuitry carried on a glass pane wherein selectively clad contact pads attached to the flexible buss bar are soldered to electrical contacts formed on the glass pane using a micro-flame soldering technique.

Another objective of the present invention is to provide a method for attaching a flexible buss bar to a glass pane wherein selectively clad contacts are soldered to contacts formed on the glass pane using a robotically wielded soldering iron.

Yet another objective of the present invention is to provide a method for attaching flexible buss bar to a glass pane wherein selectively clad contacts are soldered to contacts formed on the glass pane using resistance soldering.

All of these objectives, as well as others that will become apparent upon reading the detailed description of the presently preferred embodiments of the invention, are met by the Braided Buss Bar With Selectively Clad solder Pad Attachments herein disclosed.

The present invention relates to an improved flexible buss bar for attaching and supplying electrical power to electrical circuitry embedded on or within a substantially flat substrate such as a glass window pane. In general the flexible buss bar of the present invention is adapted to be joined to a silver ceramic power rail which has been screened onto the surface of a glass pane. The silver ceramic power rail is in turn connected to electrical circuitry carried by the glass pane. Most applications will require two such flexible buss bar connections in order to provide both positive and negative voltage leads to the electrical circuitry carried by the glass pane. In automotive applications, such circuitry will generally be related to rear window defrost heating elements and back light leads.

In a preferred embodiment the flexible buss bar comprises a broad flat conductor formed of a pliable metal material. It is preferred that the flexible buss bar be in the form of a multi-stranded braided conductor due to the increased flexibility and strength of stranded conductors. Furthermore, the buss bar must have sufficient cross sectional area to safely accommodate the current requirements of the electrical devices supplied by the flexible buss bar.

A number of metallic contact pads are mechanically attached along the length of the flexible conductor. The contact pads are permanently joined to the flexible braided conductor using any one of several known methods for permanently fastening two metal components. For example, the contact pads may be resistance welded to the flexible braided conductor, or mechanically crimped, riveted, or even soldered. In any case, regardless of the fastening method employed, what is necessary is that a secure mechanical bond is formed between the contact pads and the flexible braided conductor such that a low resistance connection is formed between the buss and the contact pads so that electrical current may flow freely therebetween.

Prior to bonding the metallic contact pads to the flexible braided conductor, portions of the metallic contact pads are selectively clad with a solderable material. The metallic contact pads are then attached to the braided conductor at regular intervals such that when the flexible buss bar is placed against one of the silver ceramic power rails formed on the glass, the metallic contact pads will form a number of connection points along the rail. Thus, during the assembly of the window, the flexible buss bar need only be placed against the window with the metallic contact pads of the flexible buss bar aligned with one of the silver ceramic power rails, and the solderable cladding on the metallic contact pads re-flowed to form a secure reliable solder joint between the flexible buss bar and the silver ceramic power rails.

In lieu of continuous silver ceramic power rails formed along the sides of the glass surface, it is further contemplated that individual silver ceramic contact pads may be formed on the surface of the glass pane. Employing this arrangement, the various circuit elements carried by the glass pane may be connected to the individual silver ceramic contact pads. The individual silver ceramic contact pads can be located at predefined locations such that the metallic contact pads of the flexible buss bar can be attached to the braided conductor at corresponding intervals. Thus, when the flexible buss bar is placed against the glass pane, the metallic contact pads of the flexible buss bar may be aligned with the silver ceramic pads formed on the glass pane, and soldered thereto. This method is less expensive in that the individual screened contact pads consume less silver than the full length continuous power rails previously described.

The flexible buss bar of the present invention allows a multiplicity of soldering methods to be employed in attaching the buss bar to the glass pane. In addition to utilizing the traditional soldering iron technique, the selective cladding on the metallic contact pads can also be melted using more reliable and controlled techniques in order to ensure a highly repeatable bonding process and to reduce variability in quality between solder joints. These alternate solder techniques include, but should not be limited to, micro-flame soldering, resistance soldering, laser soldering, as well as other techniques well known to those skilled in the art. These more controlled soldering methods allow the flexible buss bar assembly process to be more readily adapted to automated assembly techniques such as robotic assembly.

The present invention further relates to a method of attaching a flexible buss bar to electrical contact structures formed on a glass pane. The method includes the steps of providing a flexible conductor, providing at least one metallic contact element and selectively cladding the contact element with a solderable material having a relatively low melting point, and affixing the at least one contact element to the flexible conductor. The flexible buss bar assembly is then placed against the glass pane such that the solder cladding on the at least one metallic contact element is aligned with and physically engages the contact structure formed on the glass pane. Finally, when so aligned the cladding on the metallic contact element is reflowed to physically and electrically bond the metallic contact element to the electrical contact structure formed on the glass pane.

Thus is provided a flexible buss bar adapted for electrical connection with electrical circuitry carried by a substantially flat substrate such as a glass pane. The flexible buss bar includes a flexible, and preferably a stranded and braided conductor having at least one metallic contact pad affixed thereto. Solder cladding is adhered to the metallic contact such that the at least one metallic contact pad may be bonded to a corresponding contact structure located on the flat substrate.

BRIEF DESCRIPTION OF THE DRAWINGS

FIG. 2 shows a plan view of a flexible buss bar according to the present invention;

FIG. 3 shows a plan view of the opposite side of the flexible buss bar of FIG. 2, and shows metallic contact pads aligned with a silver ceramic power rail adhered to the surface of a glass pane;

FIG. 4 shows a section view of a glass pane to which a flexible buss bar according to the present invention is to be attached;

FIG. 5 shows the section view of FIG. 3 after the solderable cladding adhered to a contact pad attached to the flexible buss bar has been re-flowed to bond the flexible buss bar to a silver ceramic contact structure screened onto the surface of the glass pane.

DETAILED DESCRIPTION OF THE PREFERRED EMBODIMENTS

The present invention relates to a flexible buss bar for providing electrical connection to electrical circuitry embedded on or within a substantially flat substrate such as a glass pane. The flexible buss bar of the present invention is particularly adapted to form an electrical connection between an external power source and embedded circuitry formed on or within the rear window of an automobile.

Figure 1:
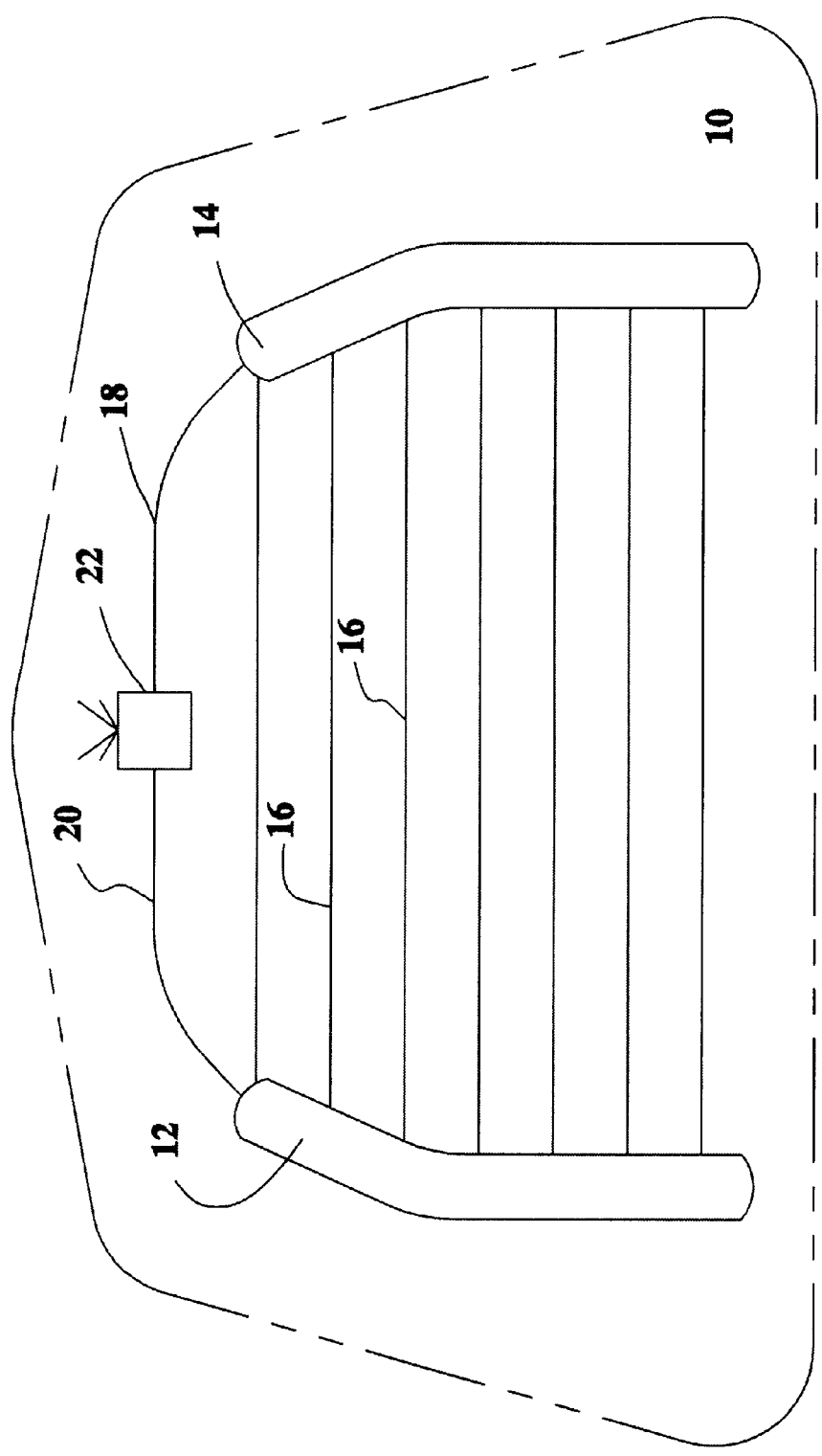
FIG. 1 shows a schematic view of a typical automotive rear window defrost system.

Referring to FIG. 1, a typical automobile rear window pane is shown 10. The glass pane includes a pair of power rails 12, 14. Typically the power rails 12, 14 are formed of a silver ceramic material silk screened onto the surface of the glass pane in the pattern shown, or some similar variation thereof. The window, including the silver ceramic pattern, is then fired at high temperature to permanently bond the conductive pattern onto the glass surface. While silk screening and firing is the preferred method of forming conductive circuitry on to the glass pane, the actual method employed is not material to practicing the present invention. However, the material forming the power rails 12, 14 must be sufficient to act as a supporting structure for joining an external conductor to the glass pane, and must be capable of conducting electrical current sufficient to satisfy the electrical requirements of the electrical components carried by the glass pane 10. A series of narrower conductive traces 16, 18, and 20 are also screened onto the glass surface 10 along with the power rails 12, 14. Conductive traces 16 extend directly between the two rails 12, 14 and form a resistance path therebetween. Electrical traces 18 and 20 are each connected to opposite rails 12 and 14 respectively, and are configured to connect to an electrical device such as a center rear brake lamp 22.

Referring now to FIG. 2, a flexible buss bar 100 according to the present invention is shown. The flexible buss bar 100 includes a flexible conductor 102 having a plurality of contact pads 104 fixedly attached thereto. In the preferred embodiment, flexible conductor 102 is a broad flat multi-stranded braided conductor. This configuration allows the conductor to have greater flexibility and greater strength, thereby providing longer life for the flexible buss bar 100. In some applications an insulating jacket 108 may be provided between the contact pads 104 to prevent the flexible conductor 102 from being inadvertently short circuited with other metal components located near the buss bar.

Each contact pad 104 includes a portion of its surface which is selectively covered by a solderable cladding 106. In the preferred embodiment the solderable cladding 106 is formed of a soft metal alloy made up of 25% tin, 62% lead, 3% silver, and 10% bismuth, however it should be clear to those skilled in the art that other solder alloys will function equally well, and may be substituted freely without departing from the novel aspects of the invention. As can be seen in FIG. 2, the solderable cladding 106 is only adhered the lateral ends of contact pads 104, and no solderable material is contained in the central region of the contact pads. This allows the contact pads 104 to be mechanically attached to the flexible conductor 102 without interference from the solderable cladding 106.

Referring now to FIGS. 1, 3, 4 and 5, the process of attaching the flexible buss bar of the present invention to an automobile rear window assembly will now be described. The function of the flexible buss bar 100 is to provide an electrical connection between the two power rails 12, 14 formed on the glass pane 10 and an external power supply located elsewhere on the vehicle. A first flexible buss bar 100 driven by a first voltage, for example 12V, is attached to the first power rail 12, and a second flexible buss bar 100 driven by a second voltage, for example ground potential, is attached to the second power rail 14. When attached in this manner, the voltage differential between power rail 12 and power rail 14 causes a current to flow through resistive traces 16, thereby generating heat to evaporate condensation and melt ice which may have formed on the surface of the glass pane 10. Furthermore, conductive traces 18, 20, each connected to the opposite power rail 12, 14 respectively, supply a useable voltage differential to a rear window mounted electrical device such as the center rear brake lamp 22.

FIG. 3 shows a single flexible buss bar 100 attached to power rail 12. The process of attaching a second single flexible buss bar 100 to power rail 14 is identical to the process of attaching a first flexible buss bar 100 to power rail 12 as described herein, and for the sake of brevity will not be repeated. The flexible buss bar 100 is placed parallel to the glass surface 10 along the length of power rail 12. The flexible buss bar 100 is oriented such that the metallic contact pads 104 are disposed between the flexible conductor 102 and the power rail 12 in direct contact with the silver ceramic material comprising power rail 12. This arrangement is shown in profile in FIG. 4. It should be clear that the physical contact between the solderable cladding 106 of the metallic contact pads 104 and the silver power rail 12 provides an electrical connection through which electrical current can be transferred from the flexible buss bar 100 to the electrical circuitry carried by glass pane 10. In order to make the connection permanent, however, the solderable cladding 106 must be re-flowed to form a permanent bond between the power rail 12 and the metallic contact pads 104 affixed to flexible conductor 102. FIG. 5 shows such a solder joint after the solderable cladding 106 has been re-flowed. The cladding process in which the solderable cladding 106 is adhered to the metallic contact pads 104 allows for a fairly precise amount of solder to be deposited thereon. Thus, the amount of solderable material 106 on each metallic contact pad 104 is fairly consistent from one metallic contact pad 104 to the next. This removes one source of variability from the soldering process and makes the flexible buss bar 100 of the present invention more amenable to attachment through automated methods.

Among the advantages of the present invention is that the process of soldering the metallic contact pads 104 to the silver ceramic power rails 12, 14 can be carefully controlled, and the quality of the solder joints formed thereby can be consistently repeated over innumerable repetitions of the process. This consistency may be further enhanced by the choice of soldering methods employed in re-flowing the solder cladding 106. For instance, the solderable cladding may be melted by applying a standard soldering iron or similar physical means of applying heat to the solder cladding. However, this approach suffers many of the control drawbacks common to the alternate prior art methods of attaching flexible buss bars to glass panes. A better approach is to use a heat source which can be controlled more precisely to provide more localized heating in the region of the solderable cladding only. Resistance soldering, micro-flame soldering, or laser soldering, among others, provide such controlled localized heating and are particularly well suited for re-flowing the solder cladding 106 selectively adhered to the metallic contact pads 104 in order to bond the flexible buss bar 100 to the glass pane 10.

A further advantage of the present invention is that each flexible buss bar is connected to its associated silver ceramic power rail 12,14 at multiple locations. Thus, as with the solder button technique described in the background of the invention, the silver ceramic power rails 12, 14 do not need to carry the full current consumed by all of the electrical components carried by the glass pane 10. Therefore, the width of the power rails 12, 14 may be reduced with a corresponding reduction in the amount of silver necessary to form the power rails. Thus, the cost of the entire window assembly is reduced.

Figure 6:
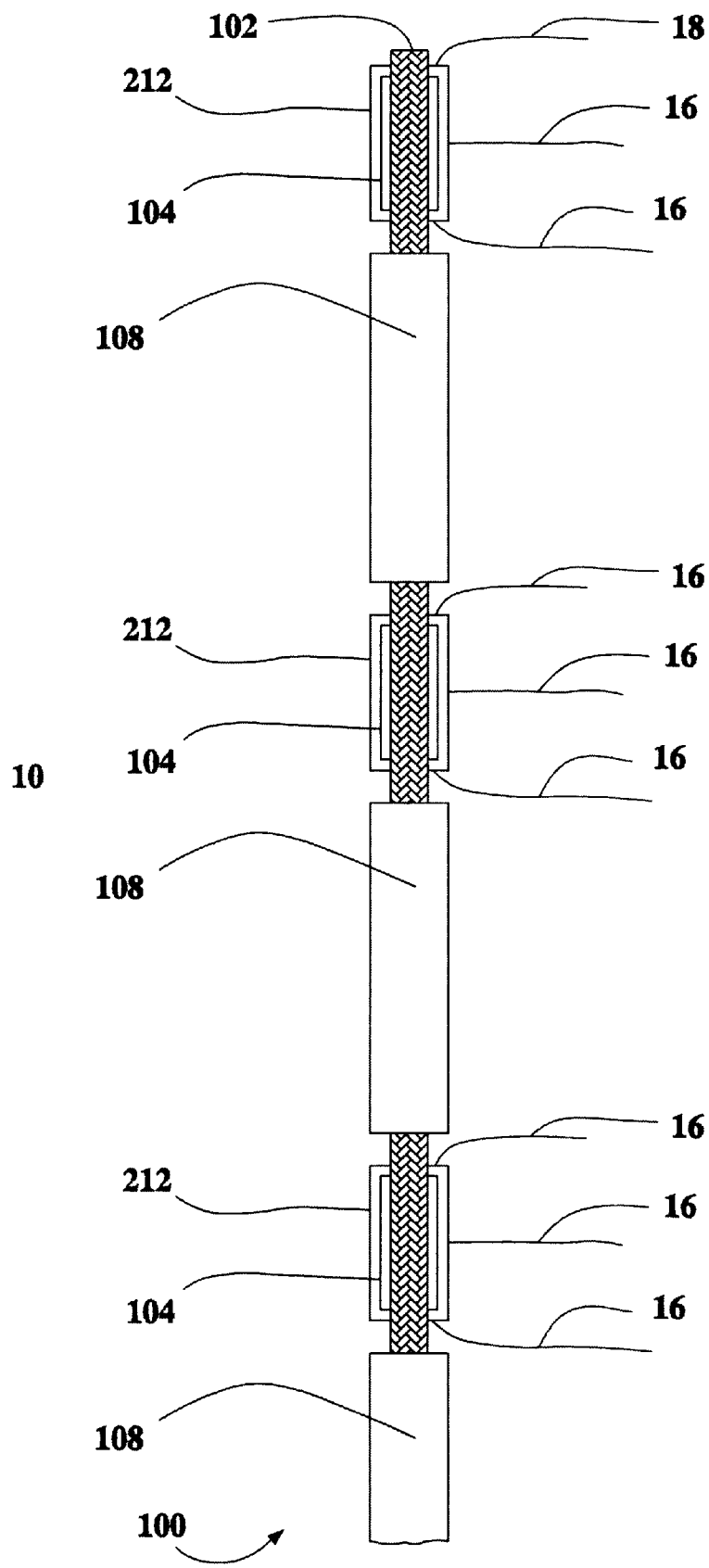
FIG. 6 shows a plan view of a flexible buss bar according to the present invention wherein each of a plurality of metallic contact pads are aligned with corresponding silver ceramic contact pads adhered to the surface of a glass pane.

Referring now to FIG. 6, an alternate arrangement is shown for attaching the flexible buss bar 100 to the surface of a glass pane 10. Employing this arrangement a further reduction in the amount of silver necessary to form the power rails can be achieved. In this embodiment, rather than having two continuous power rails extending down the sides of the glass pane, the power rails are made discontinuous, forming a plurality of individual silver ceramic contact pads 212 along the sides of the glass pane 10. The size and location of the of the silver ceramic contact pads 212 correspond to the size and location of the metallic contact pads 104 affixed along the length of flexible conductor 102. When flexible buss bar 100 is placed flat against the surface of the glass pane 10, the solderable cladding 106 formed on the metallic contact pads 104 will accurately line up with the silver ceramic contact pads 212 and may be re-flow soldered directly thereto. The electrical traces comprising the window mounted circuitry can be connected to the various contact pads 212 and from there draw current directly from the flexible buss bar 100. Thus the gaps between the individual contact pads 212 create large areas of open glass which would otherwise be covered with silver ceramic material. Thus, the amount of silver necessary to form the conductive pattern on the window may be reduced.

In addition to the flexible buss bar apparatus described above, the present invention further encompasses a method for attaching a flexible buss bar to electrical circuitry embedded on or within a glass pane. The method includes the steps of providing a flexible conductor, preferably similar to the stranded braided conductor 102 described with regard to FIG. 2. Supplying at least one, and preferably a multiplicity of, metallic contact pads 104, and selectively cladding the metallic contact pads with a solderable material 106, and affixing the metallic contact pads 104 to the flexible conductor 102 at predefined intervals along the length thereof. The flexible buss bar 100 is then place against the glass pane 10 (see FIG. 3). When the flexible buss bar is placed against the glass pane 10, the solderable cladding 106 adhered to each contact pad 104 will physically engage one of the silver ceramic power rails 12, 14 screened onto the glass pane 10. The solderable cladding 106 is then re-flowed to form a permanent bond between the metallic contact pads 104 and the silver ceramic power rails 12, 14. The attachment method of the present invention contemplates a number of methods for re-flowing the solderable cladding 106, including the use of standard soldering irons, resistance soldering, laser soldering, or micro-flame soldering. It should be obvious to those skilled in the art that any method of supplying sufficient heat to meld the solderable cladding 106 will be sufficient to re-flow the solderable cladding 106 and bond the metallic contact pads 104 to the silver ceramic power rails 12, 14.

Further, it should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A flexible buss bar adapted for electrical connection with circuitry carried by a glass pane, the flexible buss bar comprising:

a flexible conductor;

at least one metallic contact pad affixed to the conductor;

solder cladding selectively adhered to portions of the at least one metallic contact pad;

whereby the at least one metallic contact pad may be bonded to corresponding structures located on the glass pane.

2. The flexible buss bar of claim 1 wherein the at least one metallic contact pad is resistance welded to the flexible buss bar.

3. The flexible buss bar of claim 1 wherein the at least one metallic contact pad is mechanically crimped to the flexible buss bar.

4. The flexible buss bar of claim 1 wherein a rivet attaches the at least one metallic contact pad to the flexible buss bar.

5. The flexible buss bar of claim 1 comprising a plurality metallic contact pads affixed along the length of the flexible buss bar at pre-defined intervals corresponding to the locations of electrical contact elements formed on said glass pane.

6. The flexible buss bar of claim 5 wherein said flexible buss bar comprises a substantially flat, braided, multi-stranded conductor.

7. The flexible buss bar of claim 6 wherein the at least one metallic contact pad is resistance welded to the flexible buss bar.

8. The flexible buss bar of claim 7 wherein the solder cladding selectively adhered to the metallic contact pads is located on each side of the resistance weld.

9. The flexible buss bar of claim 8 wherein the solder cladding comprises a soft metal alloy formed of tin, lead and silver.

10. The flexible buss bar of claim 6 wherein the at least one metallic contact pad is mechanically crimped to the flexible buss bar.

11. The flexible buss bar of claim 10 wherein the solder cladding comprises a soft metal alloy formed of tin, lead and silver.

12. The flexible buss bar of claim 6 wherein a rivet attaches the at least one metallic contact pad to the flexible buss bar.

13. The flexible buss bar of claim 12 wherein the solder cladding comprises a soft metal alloy formed of tin, lead and silver.

14. A flexible buss bar configured to supply electrical current to electrical circuitry embedded within an automobile window pane, the flexible buss bar comprising:

a substantially flat multi-stranded braided metal conductor; and a plurality of metallic contact pads affixed to the braided metal conductor at predefined intervals along a length thereof, the position of the contact pads corresponding to locations of mating contact structures formed on the surface of said window pane, selective portions of the contact pads having a solder material metallurgically bonded thereto.

15. A window assembly comprising:

a glass pane having electrical circuitry embedded thereon;

a plurality of conductive contact pads formed at pre-defined positions on a surface of the glass pane in electrical contact with the electrical circuitry embedded thereon;

a multi-stranded flexible braided conductor having a plurality of metallic contact elements affixed thereto, the individual metallic contact elements being positioned along a length of the flexible conductor at intervals corresponding to the positions of the conductive contact pads formed on the glass pane; and re-flowed solder cladding forming a physical and electrical bond between the metallic contacts affixed to the flexible conductor and the contact pads formed on the surface of the glass pane.

* * * * *